(12) United States Patent
Boryta et al.

(10) Patent No.: US 7,858,057 B2
(45) Date of Patent: *Dec. 28, 2010

(54) PRODUCTION OF LITHIUM COMPOUNDS DIRECTLY FROM LITHIUM CONTAINING BRINES

(75) Inventors: Daniel Alfred Boryta, Cherryville, NC (US); Teresita Frianeza Kullberg, Gastonia, NC (US); Anthony Michael Thurston, Edmond, OK (US)

(73) Assignee: Chemetall Foote Corporation, Kings Mountain, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/425,733

(22) Filed: Apr. 17, 2009

(65) Prior Publication Data

US 2009/0214414 A1 Aug. 27, 2009

Related U.S. Application Data

(60) Continuation of application No. 12/114,054, filed on May 2, 2008, now Pat. No. 7,547,426, which is a continuation of application No. 11/706,027, filed on Feb. 14, 2007, now Pat. No. 7,449,161, which is a division of application No. 11/332,134, filed on Jan. 13, 2006, now Pat. No. 7,214,355, which is a division of application No. 10/395,984, filed on Mar. 25, 2003, now Pat. No. 7,157,065, which is a continuation-in-part of application No. 09/707,427, filed on Nov. 7, 2000, now Pat. No. 6,936,229, which is a division of application No. 09/353,185, filed on Jul. 14, 1999, now Pat. No. 6,207,126.

(60) Provisional application No. 60/100,340, filed on Sep. 14, 1998, provisional application No. 60/093,024, filed on Jul. 16, 1998.

(51) Int. Cl.
*C01D 15/04* (2006.01)

(52) U.S. Cl. ..................................... 423/179.5; 423/197

(58) Field of Classification Search .............. 423/179.5, 423/197

See application file for complete search history.

(56) References Cited

U.S. PATENT DOCUMENTS

| | | | |
|---|---|---|---|
| 2,516,109 A | 7/1950 | Ellestad et al. | |
| 2,793,934 A | 5/1957 | Cunningham | |
| 3,112,171 A | 11/1963 | Archambault | |
| 3,278,260 A | 10/1966 | Hermann | |
| 3,857,920 A | 12/1974 | Grantham et al. | |
| 4,036,718 A | 7/1977 | Brown | |
| 4,124,684 A | 11/1978 | Olivier et al. | |
| 4,243,392 A | 1/1981 | Brown et al. | |
| 4,261,960 A | 4/1981 | Boryta | |
| 4,271,131 A | 6/1981 | Brown et al. | |
| 4,274,834 A | 6/1981 | Brown et al. | |
| 4,463,209 A | 7/1984 | Kursewicz et al. | |
| 4,465,659 A | 8/1984 | Cambridge et al. | |
| 4,588,565 A | 5/1986 | Schultze et al. | |
| 4,747,917 A | 5/1988 | Reynolds et al. | |
| 4,859,343 A | 8/1989 | Kullberg et al. | |
| 4,980,136 A | 12/1990 | Brown et al. | |
| 5,049,233 A | 9/1991 | Davis | |
| 5,219,550 A | 6/1993 | Brown et al. | |
| 5,262,137 A | 11/1993 | Suzuki et al. | |
| 5,599,516 A | 2/1997 | Bauman et al. | |
| 5,939,038 A | 8/1999 | Wilkomirsky | |
| 5,993,759 A | 11/1999 | Wilkomirsky | |
| 6,048,507 A | 4/2000 | Amouzegar et al. | |
| 6,063,345 A | 5/2000 | Deberitz et al. | |
| 6,143,260 A | 11/2000 | Boryta | |
| 6,207,126 B1 | 3/2001 | Boryta et al. | |
| 6,497,850 B1 | 12/2002 | Boryta et al. | |
| 6,592,832 B1 | 7/2003 | Friedrich et al. | |
| 6,921,522 B2 | 7/2005 | Boryta et al. | |
| 6,936,229 B1 | 8/2005 | Boryta et al. | |
| 7,157,065 B2 | 1/2007 | Boryta et al. | |
| 7,214,355 B2 | 5/2007 | Boryta et al. | |
| 7,449,161 B2 * | 11/2008 | Boryta et al. | 423/179.5 |
| 7,547,426 B2 * | 6/2009 | Boryta et al. | 423/179.5 |
| 2001/0028871 A1 | 10/2001 | Harrison et al. | |

FOREIGN PATENT DOCUMENTS

| | | |
|---|---|---|
| CL | 550-95 | 7/1998 |
| DE | 257245 | 6/1988 |
| DE | 195 41 558 A1 | 5/1997 |
| RU | 2050330 C1 * | 12/1995 |
| WO | WO 94/19280 | 9/1994 |
| WO | WO 99/29624 A1 | 6/1999 |

OTHER PUBLICATIONS

Perry et al. (editors) "Chemical Engineers' Handbook", 5$^{th}$ Ed., McGraw-Hill Book Co. (USA), (1973) ISBN 0-07-049478-9, pp. 19-80, 19-81 and 21-6 through 21-9.

\* cited by examiner

*Primary Examiner*—Timothy C Vanoy
(74) *Attorney, Agent, or Firm*—Fulbright & Jaworski L.L.P.

(57) ABSTRACT

Methods and apparatus for the production of low sodium lithium carbonate and lithium chloride from a brine concentrated to about 6.0 wt % lithium are disclosed. Methods and apparatus for direct recovery of technical grade lithium chloride from the concentrated brine are also disclosed.

2 Claims, 7 Drawing Sheets

PRODUCTION OF LITHIUM COMPOUNDS DIRECTLY FROM LITHIUM CONTAINING BRINES

This application is a continuation application of U.S. Ser. No. 12/114,054 filed May 2, 2008, now U.S. Pat. 7,547,426, which is a continuation application of U.S. Ser. No. 11/706,027 filed Feb. 14, 2007, now U.S. Pat. No. 7,449,161, which is a divisional application of U.S. Ser. No. 11/332,134 filed Jan. 13, 2006, now U.S. Pat. No. 7,214,355, which is a divisional application of U.S. Ser. No. 10/395,984 filed Mar. 25, 2003, now U.S. Pat. No. 7,157,065, which is a continuation-in-part of U.S. Ser. No. 09/707,427 filed Nov. 7, 2000, now U.S. Pat. No. 6,936,229, which is a divisional application of U.S. Ser. No. 09/353,185 filed Jul. 14, 1999, now U.S. Pat. No. 6,207,126.

This application claims priority under 35 U.S.C. §119(e) from U.S. Provisional Application Nos. 60/100,340 filed Sep. 14, 1998 and 60/093,024 filed Jul. 16, 1998.

BACKGROUND AND SUMMARY OF THE INVENTION

The present invention relates to an integral process that uses a minimum number of process steps for producing chemical and high purity grades of lithium carbonate and lithium chloride directly from the same natural brine source. More generally, the method also relates to a method of producing purified metal carbonate salts that are generally insoluble in water but which have corresponding bicarbonate salts that are more then 75% soluble in water by reaction with carbon dioxide.

It is desirable, from a commercial standpoint, to provide a source of lithium low in sodium content because sodium becomes reactive and potentially explosive in certain chemical processes, particularly those in production of lithium metal from lithium salts. A substantial portion of presently available lithium is recovered from brines, which also contain high levels of sodium, making the production of low sodium lithium salts difficult and expensive. At the present time, there does not exist a viable low cost integral processes for producing low sodium lithium carbonate and chemical and high purity grades of lithium chloride directly from natural brines containing lithium.

Natural brines that contain lithium also contain many constituents as illustrated in the following Table:

Production of lithium carbonate and lithium chloride with acceptable qualities from such brines requires employing techniques to remove specific cations and anions that accompany the lithium in solution, and then concentrating the lithium for extraction.

Individual applications require that these ion impurities be reduced to specific maximum levels and a number of processes have been described for removing these impurities. For example, U.S. Pat. No. 5,219,550 to Brown and Boryta describes a method for producing chemical grade lithium carbonate from natural lithium containing brine by first removing most of the components from the brine by concentrating utilizing solar evaporation techniques. Concentrating the brine with respect to lithium by solar evaporation causes most of the unwanted components to precipitate from the brine, i.e., salt out. Boron, which concentrates with the lithium, is subsequently removed using an extraction process. The remaining magnesium is removed by adding a base to precipitate magnesium carbonate and/or magnesium hydroxide, and the lithium is finally precipitated from the purified brine as lithium carbonate by the addition of soda ash. Other processes related to the above process are disclosed in U.S. Pat. Nos. 4,036,718; 4,243,392; and 4,261,960.

Other techniques for producing purified lithium salts are known. For example, German Patent DE 19,541,558 to Wusson et al describes a process to reduce sodium from lithium chloride solutions by cooling. U.S. Pat. No. 4,859,343 to Kullberg et al describes an ion exchange method for removing sodium from brines. U.S. Pat. No. 5,599,516 and Russian Patent No. 9,419,280 describe absorption/ion exchange processes for recovering lithium from brine.

U.S. Pat. No. 4,980,136 discloses a procedure for preparing chemical grade and low sodium lithium chloride (battery grade, less than 20 ppm sodium and less than 5 ppm magnesium) from concentrated natural brine by crystallizing lithium chloride from a magnesium/lithium chloride brine to produce a chemical grade of lithium chloride crystal. This is followed by alcoholic extraction of the soluble lithium chloride from the crystal leaving sodium chloride as the insoluble phase. The alcohol solution containing the lithium chloride is then filtered and evaporated to form a high purity grade of lithium chloride crystal.

East German Patent DD 257,245 describes a method for recovering lithium chloride from concentrated brine containing both calcium chloride and magnesium chloride and selec-

TABLE 1

NATURAL BRINE COMPOSITION

|  | Ocean | Dead Sea Israel | Great Salt Lake Utah | Bonneville Brine Utah | Salton Sea Brine Calif | Silver Peak Brine Nevada | Salar de Atacama Brines Chile | |
| --- | --- | --- | --- | --- | --- | --- | --- | --- |
| Na | 1.05 | 3.0 | 7.0 | 9.4 | 5.71 | 6.2 | 7.17 | 5.70 |
| K | 0.038 | 0.6 | 0.4 | 0.6 | 1.42 | 0.8 | 1.85 | 1.71 |
| Mg | 0.123 | 4.0 | 0.8 | 0.4 | 0.028 | 0.02 | 0.96 | 1.37 |
| Li | 0.0001 | 0.002 | 0.006 | 0.007 | 0.022 | 0.02 | 0.15 | 0.193 |
| Ca | 0.04 | 0.05 | 1.5 | 0.5 | 0.0 | 0.71 | 1.46 | 0.043 |
| Cl | 1.9 | 16.0 | 14.0 | 16.0 | 15.06 | 10.06 | 16.04 | 17.07 |
| Br | 0.0065 | 0.4 | 0.0 | 0.0 | 0.0 | 0.002 | 0.005 | 0.005 |
| B | 0.0004 | 0.003 | 0.007 | 0.007 | 0.039 | 0.005 | 0.04 | 0.04 |
| Li/Mg | 0.0008 | 0.0005 | 0.0075 | 0.0175 | 0.786 | 1.0 | 0.156 | 0.141 |
| Li/K | 0.0026 | 0.0033 | 0.015 | 0.0049 | 0.0155 | 0.016 | 0.081 | 0.113 |
| Li/Ca | 0.0025 | 0.0064 | 0.2 | 0.0583 | 0.0008 | 1.0 | 4.84 | 0.244 |
| Li/B | 0.25 | 0.6666 | 0.857 | 1.0 | 0.051 | 4.0 | 3.75 | 4.83 |

(All values in weight percent)

tively extracting lithium chloride with alcohol. Other patents related to such processes include U.S. Pat. Nos. 4,271,131 and 4,274,834.

U.S. Pat. No. 4,207,297 describes production of a low sodium lithium carbonate (sodium less than 10 ppm in lithium carbonate) from technical lithium carbonate. This is accomplished by reacting lithium carbonate with lime followed by filtration to produce a lithium hydroxide solution. The solution is subsequently purified with just enough carbon dioxide to remove the residual calcium and filtered. More carbon dioxide gas is added to the purified lithium hydroxide solution to re-precipitate lithium carbonate crystal as a high purity product.

Except for the methods described in DE 19,541,558, U.S. Pat. Nos. 4,243,392 and 5,219,550, the methods of the prior art are not practiced today because they are either technically or economically not viable.

Another process for producing lithium chloride is set forth in Chilean Patent Application No. 550-95, which describes a procedure whereby a purified brine containing essentially lithium chloride is directly produced from natural brines that have been concentrated by solar evaporation and treated by an extraction process to remove boron. However, the sodium, calcium, and sulfate levels in the resultant brine are too high to be an acceptable brine source of lithium chloride for producing a technical grade lithium metal, primarily because the two major remaining impurities, sodium and magnesium, have to be further reduced to acceptable levels to produce chemical grade lithium chloride crystal. Specifically, magnesium must be reduced to less than 0.005 wt % Mg, and sodium to less than 0.16 wt % Na in the anhydrous lithium chloride salt. Salting out anhydrous lithium chloride directly from brine above 110° C. in a vacuum crystallizer as described in U.S. Pat. No. 4,980,136 yields a lithium chloride containing at best 0.07 wt % Mg and 0.17 wt % Na.

It is accepted, although not proven, that lithium chloride crystal containing 0.07 wt % Mg may be too high in magnesium to be used for producing lithium metal and for subsequent use in the production of lithium organometallic compounds. Thus, the industry demands that organolithium catalysts in polymerization reactions be low in magnesium. Lithium chloride high in magnesium can also adversely affect the operation of the lithium electrolysis cell when producing the lithium metal.

As noted above, the sodium impurity in the lithium chloride crystal reports directly to the metal when producing lithium metal. Thus, low sodium lithium salts are desirable. Sodium in lithium chloride crystal above 0.6 wt % produces metal containing 1 wt % sodium or higher. Sodium concentrations of about 1 wt % in lithium metal or above render the lithium metal more reactive to natural components of air. This makes the metal more difficult and more dangerous to handle. Table 2 sets forth data concerning sodium limits and tolerances in different lithium sources:

TABLE 2

SODIUM CONTENT OF LITHIUM CHLORIDE

|  | Brown & Becherman chemical grade | Maximum limits for chemical grade metal | Na in LiCl chloride required for battery grade metal |
| --- | --- | --- | --- |
| % Lithium chloride | 99.2 | 99.2 | 99.8 |
| % Na** | 0.17 | 0.04 | 0.0006 |

**wt % in Lithium chloride

Commercial methods employed to produce low sodium lithium carbonate and lithium chloride on a commercial scale include extraction of lithium compounds from mineral deposits such as spodumene bearing ore and natural brines. A number of processes have been described and some have been commercialized for producing lithium carbonate from these sources.

One such commercial method involves extraction of lithium from a lithium containing ore or brine to make a pure lithium sulfate solution such as described in U.S. Pat. No. 2,516,109, or a lithium chloride solution such as described in U.S. Pat. No. 5,219,550. After purifying the solutions, sodium carbonate is added as either a solid or a solution to precipitate lithium carbonate crystals. The lithium carbonate is subsequently filtered from the spent liquor (mother liquor), and the lithium carbonate is washed, dried, and packaged.

Lithium carbonate is often used as a feed material for producing other lithium compounds such as lithium chloride, lithium hydroxide monohydrate, lithium bromide, lithium nitrate, lithium sulfate, lithium niobate, etc. Lithium carbonate itself is used as an additive in the electrolytic production of aluminum to improve cell efficiency and as a source of lithium oxide in the making of glass, enamels, and ceramics. High purity lithium carbonate is used in medical applications.

For example, a presently used commercial procedure for producing chemical grade lithium chloride is to react a lithium base such as lithium carbonate or lithium hydroxide monohydrate with concentrated hydrochloric acid to produce a pure lithium chloride brine. The resultant lithium chloride brine is evaporated in a vacuum crystallizer at or above 110° C. to produce an anhydrous lithium chloride crystal product. This procedure yields a product that meets most commercial specifications for chemical grade lithium chloride, but not low sodium grades of lithium chloride. Chemical grade lithium chloride is suitable for air drying applications, fluxes, an intermediate in manufacture of mixed ion-exchange zeolites, and as a feed to an electrolysis cell for producing chemical grade lithium metal. Chemical grade lithium metal is used, inter alia, to produce lithium organometallic compounds. These compounds are used as a catalyst in the polymerization and pharmaceutical industry.

Chemical grade anhydrous lithium chloride should contain less than 0.16% sodium in order to produce metal containing less than 1% sodium. The importance of minimizing the sodium content in the metal and the costs associated therewith are the principle reasons for using lithium hydroxide monohydrate or lithium carbonate as the raw material for producing lithium chloride and, subsequently, lithium metal. In consideration, low sodium lithium chloride, typically contains less than 0.0008 wt % sodium, and is commercially produced to manufacture low sodium lithium metal suitable for battery applications and for producing alloys.

Commercially, low sodium lithium chloride is produced indirectly from chemical grade lithium carbonate. Chemical grade lithium carbonate is produced from Silver Peak Nevada brine, Salar de Atacama brines in Chile, Hombre Muerto brines in Argentina, and from spodumene ore (mined in North Carolina). The lithium carbonate is converted to lithium hydroxide monohydrate by reaction with slaked lime. The resultant slurry contains precipitated calcium carbonate and a 2-4 wt % lithium hydroxide solution, which are separated by filtration. The lithium hydroxide solution is concentrated in a vacuum evaporation crystallizer in which the lithium hydroxide monohydrate is crystallized, leaving the soluble sodium in the mother liquor solution. The crystal lithium hydroxide monohydrate is separated from the mother liquor and dried. This salt normally contains between 0.02 and 0.04% sodium.

To further reduce the sodium levels, the lithium hydroxide monohydrate must be dissolved in pure water and recrystallized, and subsequently reacted with pure hydrochloric acid to form a concentrated lithium chloride brine containing less than 10 ppm sodium. The resultant lithium chloride solution is then evaporated to dryness to yield anhydrous lithium chloride suitable for producing battery grade lithium metal containing less than 100 ppm sodium. The above process requires seven major processing steps described as follows:

1) Extraction and purification of a low boron aqueous solution containing 0.66 to 6 wt % Li from lithium containing ore or natural brine;

2) Purification of the brine with respect to magnesium and calcium and filtered;

3) Precipitation of lithium carbonate from the purified brine by addition of $Na_2CO_3$, and filtering and drying the lithium carbonate;

4) Reacting slaked lime and lithium carbonate to produce a LiOH solution and filtering;

5) Crystallizing $LiOH.H_2O$ in a vacuum crystallizer;

6) Dissolving the $LiOH.H_2O$ crystals and re-crystallizing $LiOH.H_2O$ from solution; and 7) Reacting high purity HCl with re-crystallized $LiOH.H_2O$ to produce a high purity lithium chloride brine from which low sodium lithium chloride is crystallized and drying the lithium chloride.

Low sodium lithium carbonate can be prepared from re-crystallized $LiOH.H_2O$ using the first part of the process described above. The recrystallized $LiOH.H_2O$ is then mixed with water and reacted with $CO_2$ to precipitate the lithium carbonate. The processing steps are set forth below:

1) Extraction and purification of a low boron aqueous solution containing 0.66 to 6 wt % Li from lithium containing ore or natural brine;

2) Purifying the brine is then purified with respect to magnesium and calcium and filtered.

3) Precipitate $Li_2CO_3$ from the purified brine with the addition of $Na_2CO_3$, filtered and dried.

4) React slaked lime and $Li_2CO_3$ to produce a LiOH solution and filter.

5) $LiOH.H_2O$ is crystallized in a vacuum crystallizer.

6) Dissolve again and re-crystallize $LiOH.H_2O$ from solution.

7) React $CO_2$ gas with a slurry containing re-crystallized $LiOH.H_2O$ to Crystallize low sodium high purity lithium carbonate crystal, filter and dry.

Production of lithium chloride direct from concentrated brine has also been described in U.S. Pat. No. 4,274,834.

The present invention provides an integral and novel process which reduces the number of major processing steps for producing chemical (technical) grade and low sodium lithium carbonate and lithium chloride directly from natural lithium containing brines concentrated to about 6.0 wt % Li without the lithium hydroxide monohydrate single and double recrystallization steps present in the processes of the prior art.

The present invention also relates to a method for preparing chemical grade lithium chloride direct from the same concentrated starting brine as that used to prepare the lithium carbonate.

The present invention incorporates the process described in U.S. Pat. No. 5,219,550 to produce a chemical grade lithium carbonate to specifically utilize the mother liquor by-product stream from that process to recover lithium from the magnesium containing purification muds that are formed when producing lithium chloride directly from brine, eliminating the steps of first precipitating lithium carbonate or lithium hydroxide and then transforming these salts to lithium chloride. Additionally, the process of the invention yields a high purity lithium carbonate having less than about 0.002 wt % sodium using a carbon dioxide/bicarbonate cycle, and a process of preparing a high purity lithium chloride by reacting the high purity lithium carbonate with a high purity hydrochloric acid.

A preferred method is directed to a continuous process for directly preparing high purity lithium carbonate from lithium containing brines by preparing a brine containing about 6.0 wt % lithium and further containing other ions such as sodium, magnesium, calcium, and sulfates naturally occurring in brines; adding mother liquor containing carbonate from a prior precipitation step to precipitate magnesium as magnesium carbonate; adding a solution of CaO and sodium carbonate to remove calcium and residual magnesium; precipitating lithium carbonate from the purified brine by adding soda ash solution; filtering the resultant solution to obtain solid lithium carbonate; preparing an aqueous slurry of the lithium carbonate in a reactor equipped with an inlet for introducing carbon dioxide gas into said aqueous slurry to form an aqueous lithium bicarbonate solution, the reactor being at a temperature from at least minus 10 to +40° C.; passing said aqueous lithium bicarbonate solution through a filter to clarify the solution and optionally an ion exchange column for further calcium and magnesium removal; introducing said filtered lithium bicarbonate solution into a second reactor and adjusting of the solution to from 60-100° C. to precipitate ultra-pure lithium carbonate with sodium less than 0.0002 wt %, calcium less than 0.00007 wt % and magnesium less than 0.00001 wt %.

Another preferred embodiment relates to a continuous process for directly preparing high purity lithium carbonate from lithium containing brines by preparing a brine containing about 6.0 wt % lithium and further containing other ions such as sodium, magnesium, calcium, and sulfates naturally occurring in brines; adding CaO to remove magnesium; adding mother liquor containing carbonate from a prior precipitation step and soda ash solution to precipitate calcium carbonate; filtering to remove calcium carbonate and to yield a purified lithium containing brine; adding soda ash to said purified brine to precipitate lithium carbonate; filtering the solution to recover the precipitated lithium carbonate, preparing an aqueous lithium carbonate slurry in a reactor where such reactor is equipped with an inlet for introducing carbon dioxide gas into the lithium carbonate slurry to produce an aqueous lithium bicarbonate solution, wherein the reactor is at a temperature from at least minus 10 to +40° C.; passing the aqueous lithium bicarbonate solution through a clarifying filter and optionally an ion exchange column for further calcium and magnesium removal; introducing the filtered solution into a second reactor and adjusting the temperature of the solution to from 60-100° C. to precipitate the ultra-pure lithium carbonate with sodium less than 0.0002 wt %, calcium less than 0.00007 wt % and magnesium less than 0.00001 wt %.

In preferred embodiment, the lithium bicarbonate is only passed through a filter and proceeding to the second reactor at 60-100° C. to precipitate low sodium lithium carbonate with a sodium content of less than 0.0002 wt %.

In other preferred embodiments the lithium bicarbonate is only passed through a filter and proceeding to the second reactor at 60-100° C. to precipitate low sodium lithium carbonate with a sodium content of less than 0.0002 wt %.

In other embodiments, the carbon dioxide absorption reactor is from minus 10° C. but not more than 40° C., and preferably from 0-35° C., and the temperature of the reactor for precipitating high purity lithium carbonate is from 60-100° C., preferably 70-95° C.

A preferred ion exchange column contains Amberlite IRC-718 as a cation exchange resin.

The methods are conducted at less than or equal to atmospheric pressure.

The high purity lithium carbonate preferably contains less than 20 ppm sodium as an impurity, preferably less than 2 ppm sodium.

In a preferred embodiment, the purified lithium carbonate contains

| Wt % | High Purity Low Sodium $Li_2CO_3$ |
|---|---|
| Li2CO3 | >99.4 |
| Mg | <0.0007 |
| Na | <0.0010 |
| K | <0.00025 |
| Ca | <0.0120 |
| B | <0.0001 |
| Al | <0.0002 |
| As | <0.0001 |
| Fe | <0.0001 |
| Si | <0.0010 |
| Zn | <0.00005 |
| SO4 | <0.037 |
| Cl | <0.005 |

In another preferred embodiment, the purified lithium carbonate has the following composition:

| Wt % | Ultra-High Purity Li2CO3 |
|---|---|
| Li2CO3 | >99.995 |
| Mg | <0.00001 |
| Na | <0.0002 |
| K | <0.00015 |
| Ca | <0.00007 |
| B | <0.0001 |
| Al | <0.0002 |
| As | <0.0001 |
| Fe | <0.0001 |
| Si | <0.00011 |
| Zn | <0.000014 |
| SO4 | <0.0030 |
| Cl | <0.005 |

The invention also relates to high purity lithium chloride containing less than 20 ppm sodium, and preferably less than 8 ppm sodium.

Such high purity lithium chloride is prepared by a process which is also a part of the present invention, the process including the steps of reacting lithium carbonate having a sodium content of less than 0.0002 wt % with hydrochloric acid having less than 1 ppm sodium to produce high purity lithium chloride having sodium content of less than 0.001 wt %. The lithium carbonate may be prepared according to processes described above and elsewhere herein.

The present invention also provides an apparatus for continuously purifying lithium carbonate having a dissolver which is a baffled reactor to dissolve lithium carbonate that includes a mixer/disperser, a carbon dioxide gas dispersion tube, a wash water filtrate/mother liquor filtrate recycle line, a cooler, a stilling well to separate gas and undissolved lithium carbonate solids from the resultant lithium bicarbonate solution, and a continuous chemical grade lithium carbonate crystal feeder; an inline filter to remove insoluble impurities from the lithium bicarbonate solution coming from the stilling well; a heat exchanger to recover heat from the hot mother liquor that is recycled to the dissolver; a heated gas sealed crystallizer with mixer to decompose the lithium bicarbonate solution to form low sodium lithium carbonate crystals, carbon dioxide gas, and mother liquor; a slurry valve to remove the low sodium lithium carbonate crystals and mother liquor from the gas sealed crystallizer; a gas line to continuously return the carbon dioxide produced in the crystallizer to the dissolver; a separator such as a continuous belt filter to separate the low sodium lithium carbonate from the mother liquor and a wash water section to wash the lithium carbonate crystals; a pump and line to return the mother liquor and wash filtrate to the dissolver; a mother liquor bleed to control the sodium level and to maintain a constant liquid volume; and a carbon dioxide source. Preferably, the apparatus has a reactor using absorption columns, such as a sieve tray or a Scheibel column, to facilitate absorption of carbon dioxide in the aqueous slurries.

The invention also relates to a method for purifying metal carbonates that are insoluble in water but have corresponding metal bicarbonate salts that are more than 75% by wt. soluble in water by preparing an aqueous slurry of said metal carbonate; introducing carbon dioxide gas into said aqueous slurry to form a corresponding metal bicarbonate solution; and heating the metal bicarbonate solution to form a purified metal carbonate, wherein the heating is such that the temperature of the solution is raised to a temperature at which the metal carbonate is insoluble to precipitate the purified metal carbonate. Lithium is a preferred metal.

The pressures used to make any of these salts according to the processes may be, e.g., less than or equal to atmospheric pressure.

A preferred cation exchange resin is Amberlite IRC-718 commercially available from Rohm and Haas.

The purified salts prepared according to the methods of the invention also preferably, have a potassium content of less than 20 ppm, a calcium content of not greater than 140 ppm Ca, a magnesium content of from 3-7 ppm, and not greater than 400 ppm sulfate ($SO_4^-$), or any combination of these.

Any patents and references cited herein are incorporated by reference in their entireties.

DETAILED DESCRIPTION OF THE INVENTION

Figure 1:
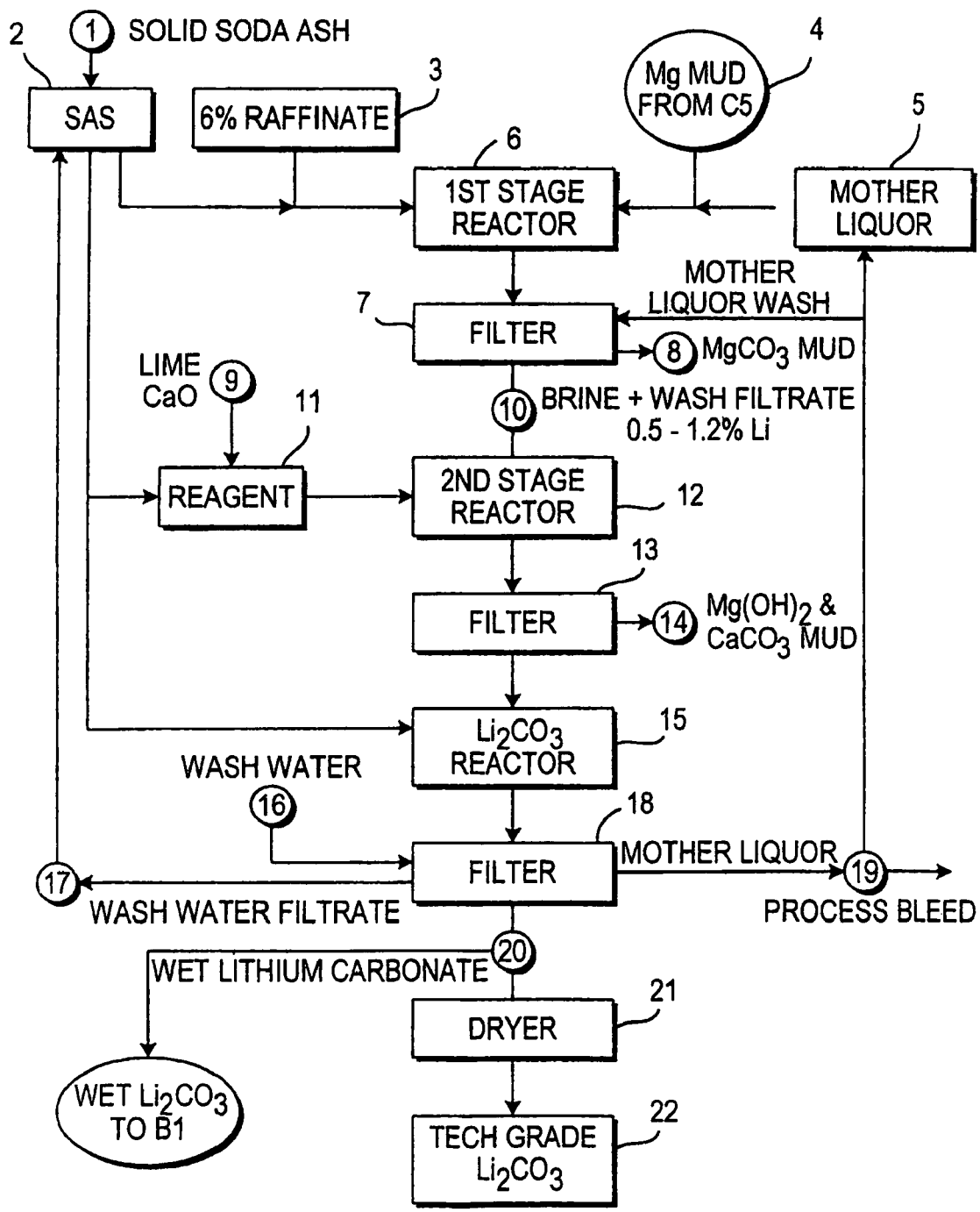
FIG. 1 is a flow diagram showing the production of technical grade lithium carbonate according to the present invention.

The following describes in detail the process for making low sodium lithium carbonate from chemical grade lithium carbonate without the need for using the double crystallization process for making high purity lithium hydroxide monohydrate.

There are different chemical compositions of brine that exists in nature that contain lithium (see Table 1, supra). For example, there exist in the Salar de Atacama basin two different types of lithium containing brine. These are described as high sulfate brine and high calcium brine. Sulfate may be removed from the brine by adding either lime or a calcium chloride by-product from another source, or mixing with a brine containing calcium to precipitate the calcium and sulfate as gypsum ($CaSO_4.2H_2O$). This produces a low calcium low sulfate brine that can be solar concentrated and have a higher lithium yield than concentrating a brine containing sulfate or calcium. Reducing the sulfate in the brine also allows for better recoveries of potash from brines that naturally contain potassium.

The natural brine is concentrated to a lithium content of about 6.0%, e.g. 6.0-6.5% by solar evaporation. During the solar evaporation process, gypsum continues to co-precipitate with sodium chloride when sulfate and calcium are stoichiometrically balanced. With continued evaporation, potassium chloride and sodium chloride precipitate until the lithium and magnesium concentrations increases to about 0.76 wt % Li and 5.2 wt % Mg. Concentrating the brine from 0.76 wt % Li to 1.4 wt % Li will precipitate the carnallite salt ($KCl.MgCl_2.6H_2O$). This reduces the Mg:Li ratio in solution from about 6.8:1 to 5.1:1, and removes most of the sodium and potassium from solution. Continued evaporation and concentration of the brine from 1.4 wt % Li to 4.2 wt % Li precipitates the bischofite salt ($MgCl_2.6H_2O$). This further reduces the Mg:Li ratio to 0.93:1.

Further concentration of the brine from about 4.2 wt % Li to about 6.2 wt % Li precipitates the lithium carnallite salt ($LiCl.MgCl_2.7H_2O$). This further reduces the Mg:Li ratio to about 0.24:1.

To improve the lithium yield when concentrating the brine to about 6 wt % lithium, the lithium precipitated from brine as lithium carnallite is converted to the bischofite salt and lithium chloride brine by mixing the lithium carnallite salt with brine containing between 1.4 to 3 wt % Li. In order to convert 100% of lithium carnallite to bischofite, the resultant recovered brine contained in the bischofite salt ponds must not exceed a lithium concentration of 4.2 wt % Li.

Magnesium polyborates precipitate slowly from the concentrated brines. This usually causes the boron salts to super saturate when the brine resident time in the ponds is short. As a result, the boron content of the brines can range between 0.5 to 1.2 wt % boron.

At ambient conditions, the concentrated brine will contain on the average:

| | |
|---|---|
| 6.0 ± 0.3 | % Li |
| 1.65 ± 0.4 | % Mg |
| 0.08 | % Na |
| 0.02 | % K |
| 0.033 | % Ca |
| 0.019 | % $SO_4$ |
| 0.8 ± 0.2 | % B |
| 35 ± 0.5 | % Cl |

Natural brines containing lithium, magnesium, potassium, sodium, boron, wherein calcium and sulfate are stoichiometrically balanced, will have this general composition when evaporated and concentrated under ambient conditions by solar evaporation to 6 wt % lithium. Brine containing 6.5 wt % Li cannot be further concentrated because, at ambient conditions, this concentration defines the "end point" or the drying up point of the Li—Mg—Cl—$H_2O$ system. Further evaporation will not change composition of the brine or the Mg:Li ratio of the brine, and will serve only to precipitate a mixture of lithium carnallite and lithium chloride monohydrate ($LiCl.H_2O$) as the brine evaporates. The resultant salt mixture will have the same Mg:Li ratio as the end point brine.

The boron and magnesium remaining in brine concentrated to about 6 wt % Li must be removed in order to make a suitable lithium carbonate product. It is preferred that boron is removed by an alcohol extraction such as described in U.S. Pat. No. 5,219,550, hereby incorporated by reference in its entirety. This extraction process reduces the boron in the concentrated brine to less than about 0.0005 wt % B.

Procedures known in the art for directly removing magnesium from concentrated brine as magnesium hydroxide are costly because valuable lithium will be retained by the magnesium hydroxide which forms as a voluminous precipitate which is difficult to filter. To achieve maximum lithium yields and facilitate filtration, the magnesium may be removed in two steps. As much as 97% of the magnesium may be removed as magnesium carbonate ($MgCO_3$) by mixing the concentrated brine with recycled mother liquor from the lithium carbonate precipitation step. This utilizes the carbonate present in the lithium carbonate crystallizer mother liquor and recovers most of the lithium that remains soluble in the mother liquor.

When recycling mother liquor, it is important to carefully control the $CO_3$/Mg ratio to prevent lithium carbonate from precipitating with the magnesium carbonate. This is because the lithium concentration at this point in the process may be high (0.5 to 1.2 wt % Li), but this becomes less problematic at lower lithium concentrations, e.g., at about 1.0%. After the magnesium carbonate is precipitated and filtered, the magnesium carbonate solids are given a displacement wash using lithium carbonate mother liquor to recover some of the concentrated brine retained with the magnesium carbonate solids. Using mother liquor as the wash instead of water reduces the water input to the process that must be subsequently removed as a process bleed stream. The mother liquor constitutes the process bleed whereby all the water (from brine and wash water) and sodium chloride are continuously removed from the process (from soda ash reaction with lithium and magnesium chloride) and which contains about 5% of the total lithium in the concentrated feed brine. The washed muds contain between 5 and 12% of the total lithium input and constitutes a major lithium loss for the process in addition to the lithium lost with the proceed bleed.

The magnesium remaining in the brine (generally from 0.06 to 0.02 wt % Mg) is finally removed by treating the brine with a lime/soda ash (CaO/$Na_2CO_3$) slurry to form insoluble magnesium hydroxide ($Mg(OH)_2$) and insoluble calcium carbonate ($CaCO_3$). The coprecipitated $CaCO_3$ acts as a filter aid in filtering the $Mg(OH)_2$ muds. Additional filter aid may be added to further improve filtration. The lime/soda ash ratio is adjusted to control the level of soluble calcium remaining in the purified brine.

Because magnesium hydroxide usually precipitates as a gel, it is preferred to maintain the pH between 8.45 and 9.10 (measured directly with a slurry pH electrode) in order to achieve maximum filtration rates. After separation of the solids from the purified brine, the brine contains between 0.5% Li and 1.2% Li, less than 0.0001 wt % magnesium, less than 0.0015 wt % calcium, and less than 0.0005 wt % boron.

The magnesium-calcium-boron free brine is subsequently treated with a soda ash solution to precipitate lithium carbonate and the mother liquor is recycled as described above. The sodium added to the process as $Na_2CO_3$ is removed with the mother liquor bleed stream as dissolved sodium chloride (NaCl). Hot de-ionized water is used to wash the lithium carbonate mother liquor from the filtered lithium carbonate crystal to remove sodium and chloride. The lithium in the wash filtrate is recovered by using the wash filtrate to produce the soda ash solution.

The lithium carbonate product produced by the foregoing process is characterized as technical grade, and a typical technical grade lithium carbonate contains about 0.04 wt % sodium.

This product is a suitable source of lithium for producing chemical grade lithium carbonate having less then 0.04% Na, and subsequently, low sodium lithium chloride, without need for preparation of lithium hydroxide and the recrystallization steps of prior art processes. However, the chemical grade lithium carbonate first needs to be processed to reduce these impurities to a level suitable for producing a low sodium battery grade lithium chloride. The sodium content in low sodium lithium carbonate is reduced to below about 0.0002 wt % Na.

Figure 4:
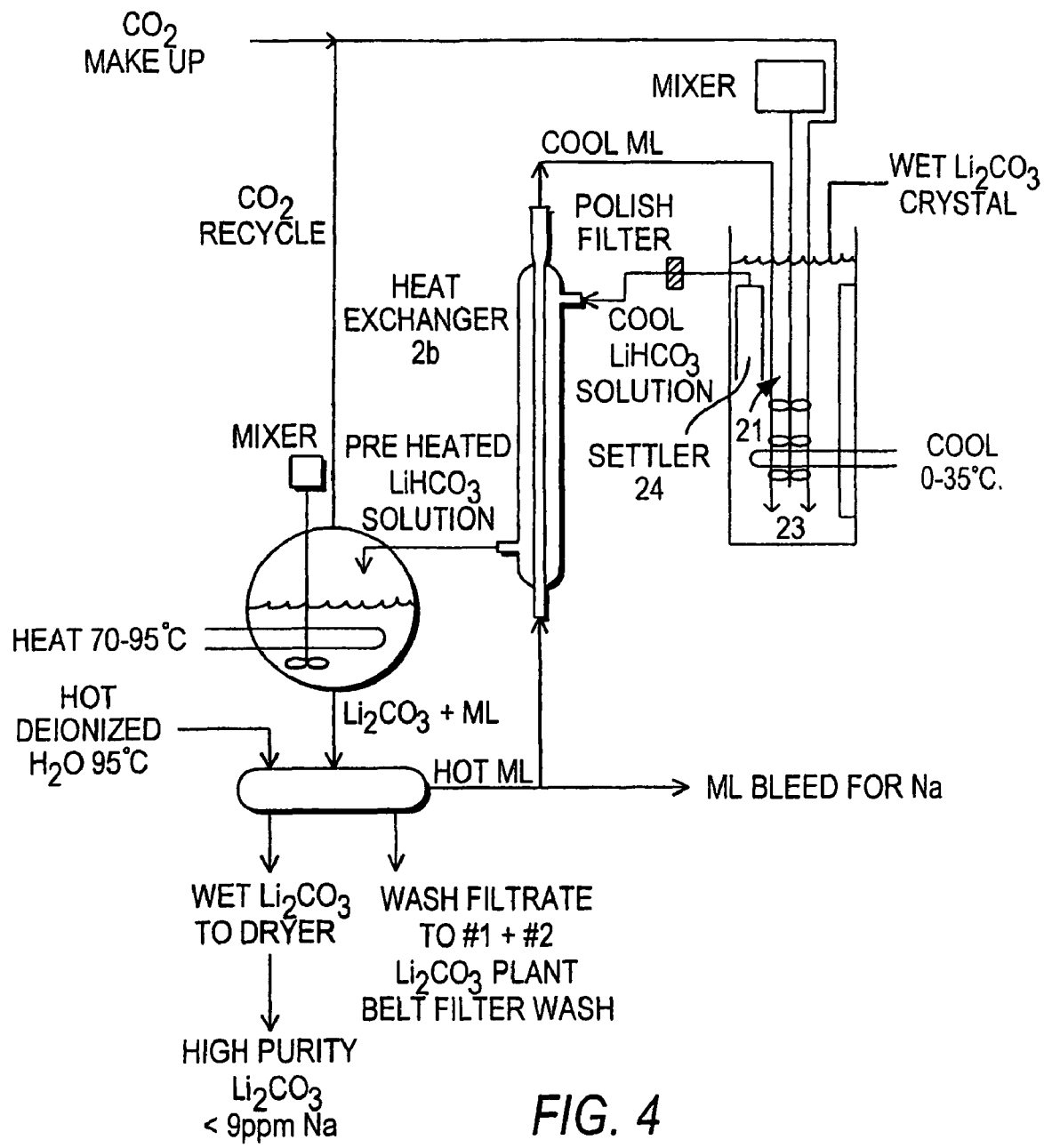
FIG. 4 is a laboratory apparatus for producing low sodium lithium carbonate according to the present invention.

Purification of the lithium carbonate to produce low sodium lithium carbonate may be conducted in a continuous reactor/crystallizer apparatus as shown in FIG. 4. The apparatus is designed to continuously dissolve lithium carbonate as lithium bicarbonate ($LiHCO_3$) by reacting a slurry (3-5% solids) of the technical grade lithium carbonate prepared as described above and water with $CO_2$ gas at room temperature (minus 10 to 40° C.) in a dissolver shown as 3 in FIG. 2. The resultant $LiHCO_3$ solution (7.0-8.5 wt % $LiHCO_3$) is transferred on a continuous basis to a crystallizer shown as 5 in FIG. 2 which is maintained at 70° C.-95° C. to precipitate high purity lithium carbonate crystals and evolve carbon dioxide gas, which may be recycled into the process. Lower temperatures may be used in the dissolver shown as 3 in FIG. 2 to increase the lithium bicarbonate concentration per cycle for purification, thereby, increasing equipment throughput.

Figure 2:
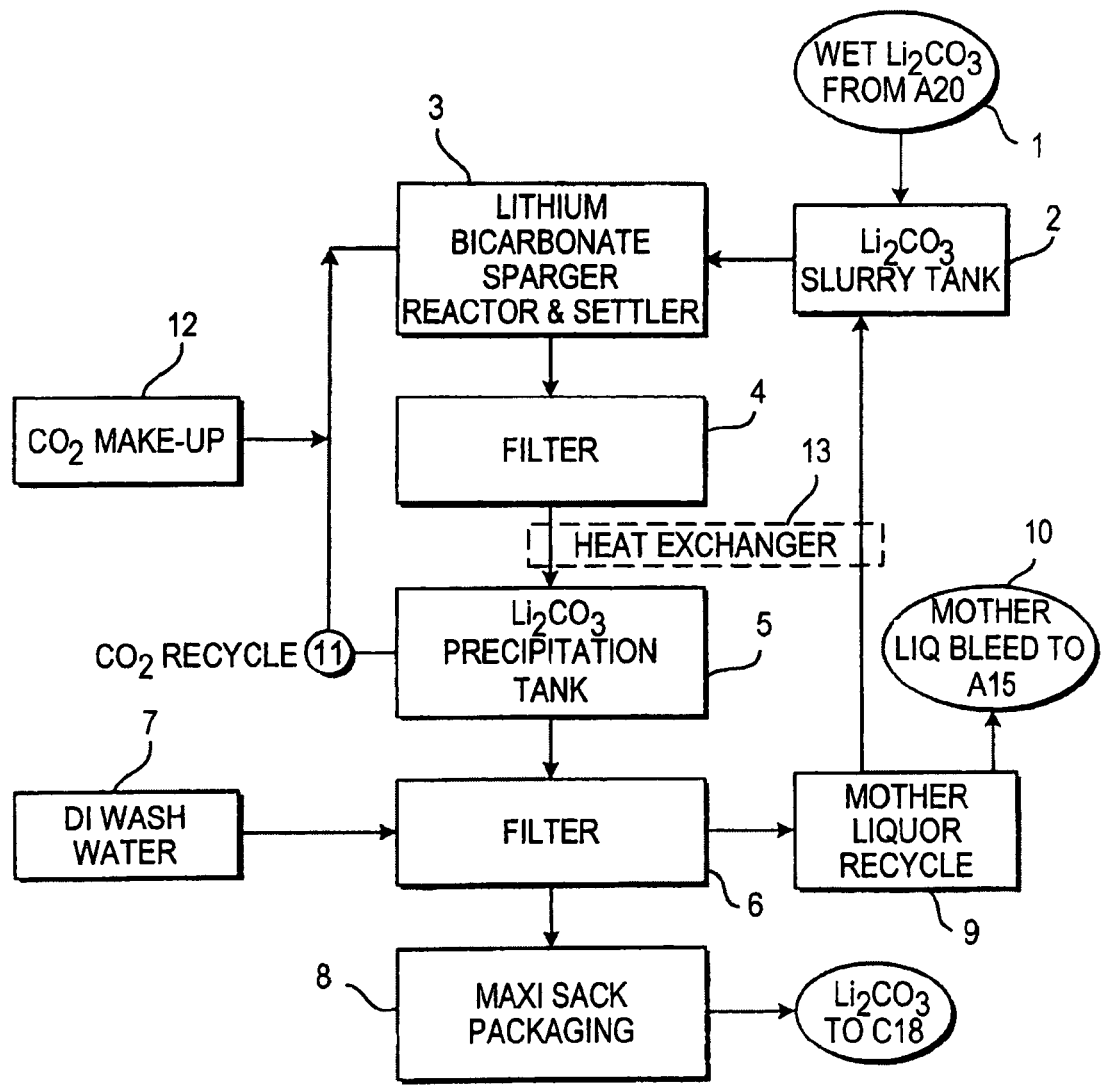
FIG. 2 is a flow diagram showing the production of low sodium lithium carbonate according to the present invention.

In the crystallizer shown as 5 in FIG. 2, high purity lithium carbonate crystals precipitate from the lithium bicarbonate solution at the higher temperature and $CO_2$ gas is evolved. The slurry is continuously removed and the lithium carbonate crystals are filtered hot and washed with sodium free de-ionized water. The lithium carbonate mother liquor contains valuable soluble lithium and is recycled to the dissolver shown as 3 in FIG. 2 to minimize lithium loss. The source of $CO_2$ may be from the gas evolved in the crystallizer, from $CO_2$ generated when reacting lithium carbonate with hydrochloric acid, or from a commercial $CO_2$ source. Use of a commercial $CO_2$ source yields a simplified process, and does not require special added equipment to recover the $CO_2$. Furthermore, no chemical reagents are required except for sodium free deionized water. The temperature differential between the dissolver shown as 3 in FIG. 2 and the crystallizer shown as 5 in FIG. 2 defines the throughput.

The apparatus in FIG. 4 is now described in more detail. The dissolver/settler is preferably a cooled baffled reactor with a high height to diameter aspect ratio containing a gas disperse/mixer designed to completely absorb $CO_2$ gas. The reactor preferably has a minimum active height of 8 feet. A settler/decanter is incorporated to eliminate undissolved solids from contaminating the clear $LiHCO_3$ solution being continuously removed from the dissolver. A baffle is preferably placed below the decanter to prevent carbon dioxide gas from entering and incapacitating the settler/decanter. The cool $LiHCO_3$ solution is polish filtered to remove insoluble impurities, then preheated with the recycled mother liquor in a heat exchanger. A cartridge filter may be incorporated prior to the heat exchanger to remove insolubles. The preheated $LiHCO_3$ solution is then pumped via a pump to a heated crystallizer where it is decomposed at between 70 and 95° C. to form low sodium lithium carbonate crystals, $CO_2$ gas, and mother liquor. The mother liquor contains dissolved lithium carbonate and a small amount of $LiHCO_3$. The mother liquor and $CO_2$ are recycled back to the dissolver/settler reactor. Sodium is removed from the process using a mother liquor process bleed so that the mother liquor contains less than 500 ppm sodium. The lithium contained in the mother liquor bleed stream is recovered by using the bleed stream as part of the wash water used on the filtration equipment for producing technical grade lithium carbonate. The number of times the mother liquor is recycled is defined by the sodium content and the degree of purification needed.

Figure 5:
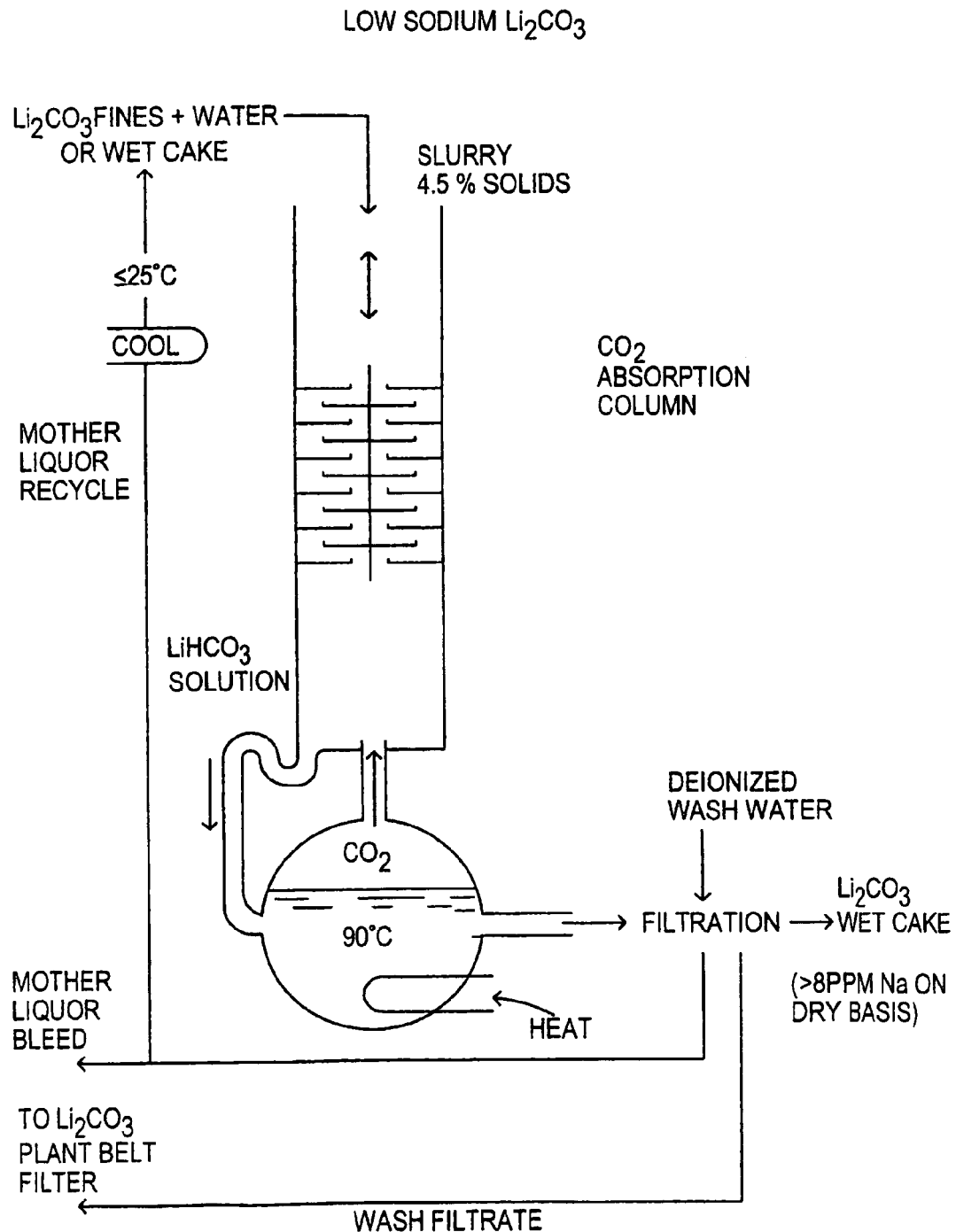
FIG. 5 is an apparatus with an absorption column for preparing the low sodium lithium carbonate according to the present invention wherein carbon dioxide from the process reaction is recycled into the absorption column.
Figure 6:
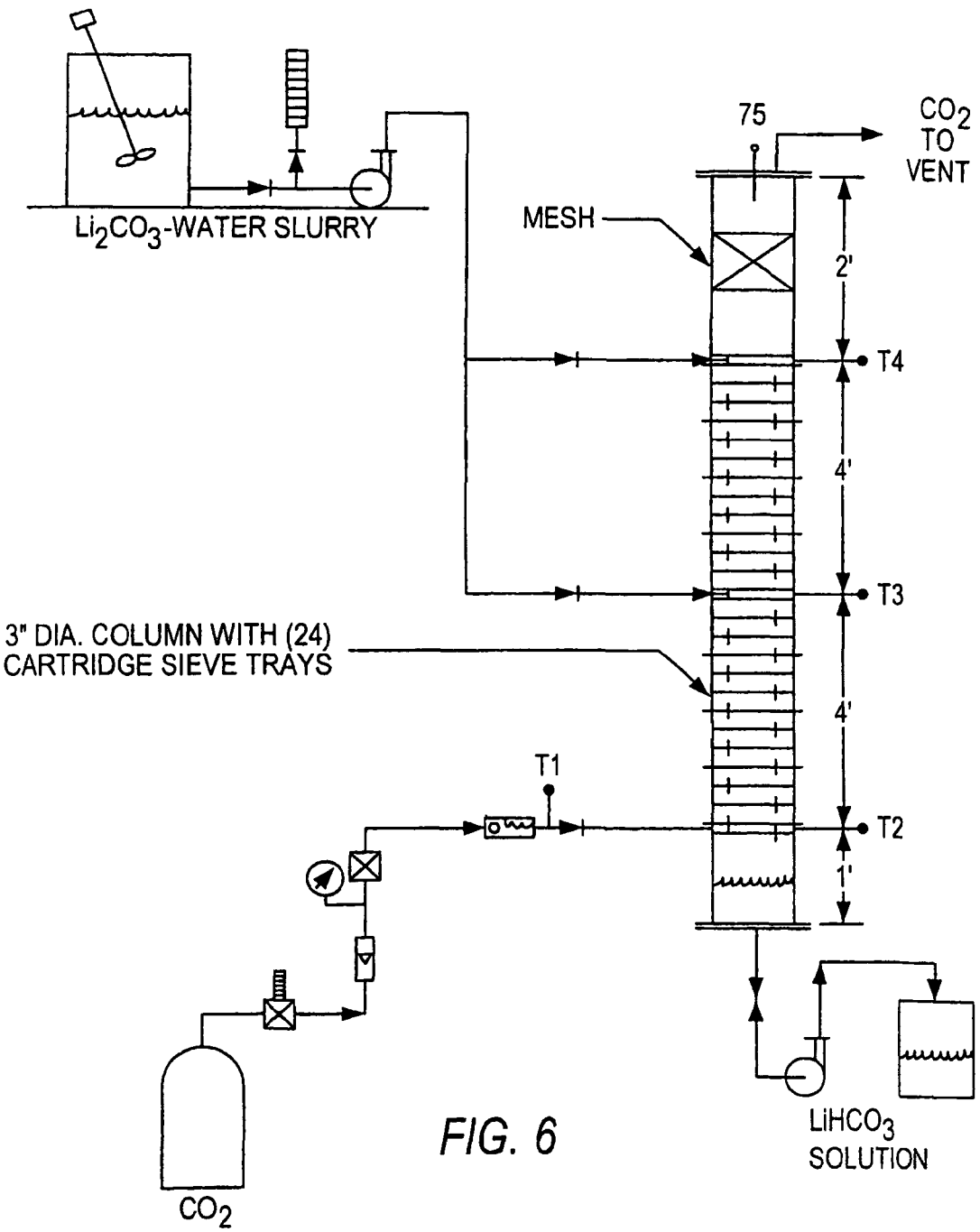
FIG. 6 shows a preferred apparatus having a sieve column for preparing the low sodium lithium carbonate of the present invention.
Figure 7:
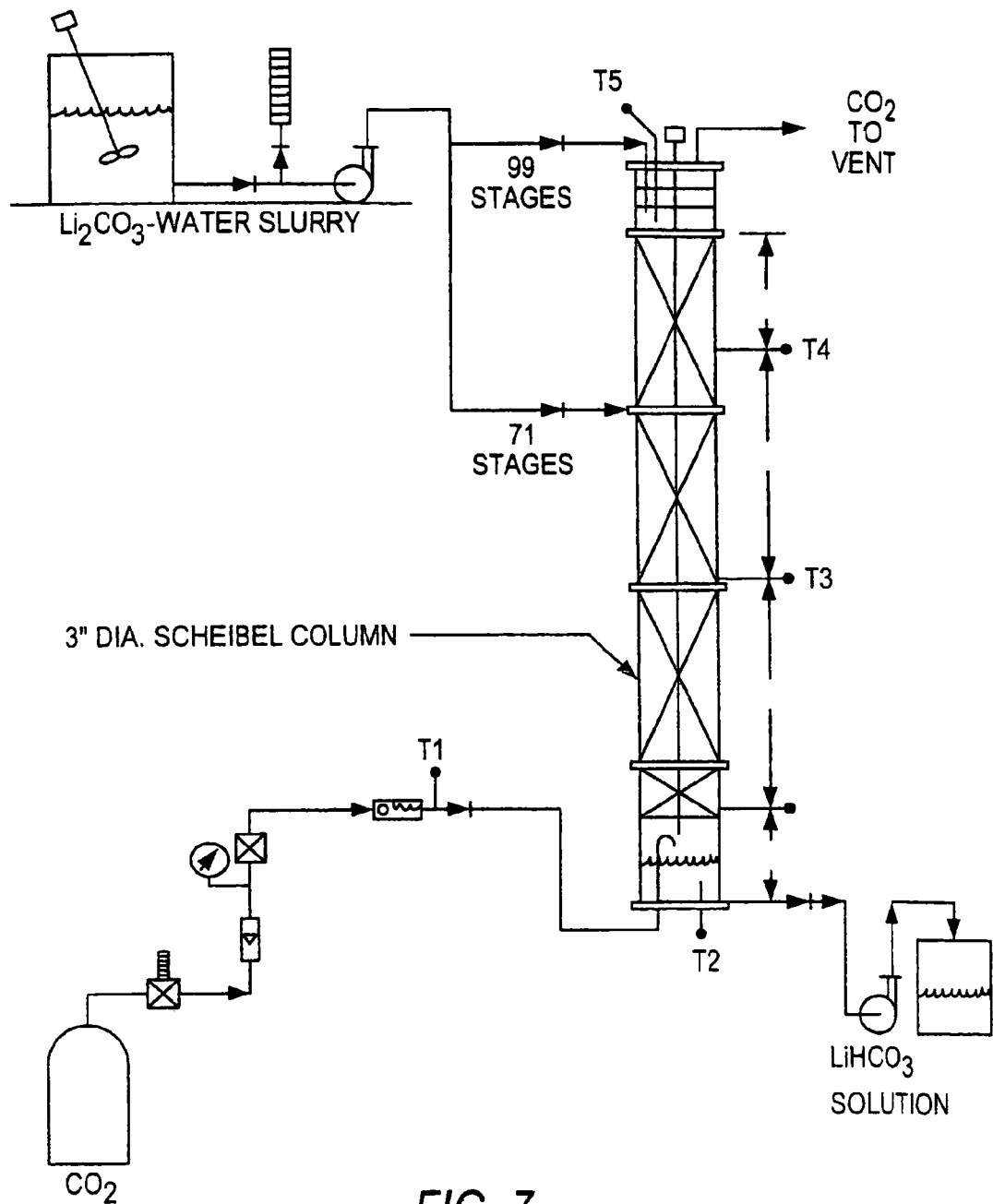
FIG. 7 shows an alternative apparatus having a Scheibel column for preparing the low sodium lithium carbonate of the present invention.

As an alternative to using a dissolver/settler for the conversion of chemical grade lithium carbonate to a $LiHCO_3$ solution is to employ, for example, a carbon dioxide absorption column such as shown in FIG. 5, a sieve tray column as shown in FIG. 6 or a Scheibel column commercially available from Glitch Technology Corporation) such as shown in FIG. 7.

Ultra high purity lithium can be produced by passing the $LiHCO_3$ solution through an ion exchange column prior to decomposing and recrystallizing the $Li_2CO_3$, to reduce total impurity content, preferably to less than 10 ppm. Of course, the brine may be passed through at any point during the process after the magnesium and calcium precipitation steps to remove other impurities. In a preferred embodiment, Amberlite IRC-718 resin commercially available from Rohm and Haas is used in the column. Prior to use, it is preferred to remove sodium from the Amberlite resin, e.g. by passing HCl through the column. A lithium hydroxide solution is then run through the column to convert the resin to the lithium form. The lithium bicarbonate solution (7.5-8% $LiHCO_3$) is then passed through the column, and the purified solution is heated to 95° C. to precipitate the lithium carbonate which is washed with 95° C. deionized water. The solid is then dried to yield high purity lithium carbonate.

Table 3 shows the typical content of the lithium carbonates prepared by the processes of the invention:

TABLE 3

CHEMICAL COMPOSITION OF CHEMICAL, LOW SODIUM, AND HIGH PURITY LOW SODIUM LITHIUM CARBONATE

| | Chemical Grade | Low Sodium | High Purity |
|---|---|---|---|
| % $Li_2CO_3$ | 99.38 ± 0.026 | 99.4 | 99.995 |
| % Mg | 0.004 ± 0.0006 | 0.0005 ± 0.0002 | 0.00001 |
| % Na | 0.069 ± 0.005 | 0.0002 ± 0.001* | 0.0002 |
| % K | 0.0003 ± 0.00002 | 0.00015 ± 0.0001 | 0.00015 |
| % Ca | 0.014 ± 0.001 | 0.012 ± 0.0014 | 0.00007 |
| % $SO_4$ | 0.037 ± 0.003 | 0.003 to 0.037* | 0.003 |
| % B | 0.0003 ± 0.00001 | <0.0001 | <0.0001 |
| % Cl | 0.01 ± 0.006 | <0.005 | <0.005 |
| % Al | 0.0007 | 0.0002 | |
| % As | 0.0002 | 0.0001 | |
| % Fe | 0.0005 | 0.0001 | |
| % Si | 0.0076 | 0.001 | 0.00011 |
| % Zn | 0.0001 | 0.00005 | 0.000014 |

*function of ion concentration in mother liquor recycle

High purity lithium chloride can then be produced from the low sodium lithium carbonate by conventional reaction in solution with hydrochloric acid such as used in the prior art, except that the hydrochloric acid must have a low sodium content, e.g. 0.02 wt % sodium or less such that additional sodium is not entered into the system as a contaminant.

The lithium carbonate processes are described in more detail with respect to FIGS. 1 and 2.

Lithium Carbonate Process Flow Diagram A

FIG. 1 shows that (1) solid soda ash is mixed with wash water filtrate (17) to make soda ash solution, SAS (2). In the first stage reactor raffinate 3 containing 6% lithium is mixed with SAS (2), mud from the direct chloride process (4) and mother liquor (5). This recovers the lithium entrained in the direct chloride muds, removes the magnesium and dilutes the lithium concentration to around 1%.

(7) The $MgCO_3$ mud (8) is separated from the brine and washed with mother liquor. The wash filtrate and the filtered brine are combined and sent to the second stage reactor (12).

(12) In the second stage reactor, reagent (11) which is a combination of lime (9) and SAS (2) is added to precipitate $Mg(OH)_2$ and $CaCO_3$ (14) which are removed by filtration (13).

(15) In the lithium carbonate reactor SAS (2) is added to precipitate lithium carbonate. The solid is separated from the mother liquor by filtration (18). The mother liquor is recycled and excess is removed through (19). The lithium carbonate is washed with water (16) which is recycled through (17) and used in the production of SAS (2)

(20) A portion of the wet lithium carbonate from the filter is sent to (B1) to be used in the production of low sodium lithium carbonate and the majority is sent to the dryer (21) and packaged as technical lithium carbonate (22).

FIG. 2

Low Sodium Lithium Carbonate Process Flow Diagram B (1) Wet lithium carbonate from (A20) is used as feed material.

(2) Lithium carbonate is mixed with the bicarbonate/carbonate mother liquor recycle and fed into the lithium bicarbonate sparger reactor (3).

(3) Carbon dioxide gas is bubbled into the reactor where it reacts with the lithium carbonate forming lithium bicarbonate.

$$H_2O+CO_2+LiCO_3 \text{---} > 2LiHCO_3 \quad \text{Reaction \#1}$$

(4) Lithium bicarbonate solution is filtered to remove insoluble and un-reacted small particles that are not removed by the settler.

(5) Lithium bicarbonate solution is heated to 90° C. to reverse Reaction #1 and precipitate purified lithium carbonate.

$$2LiHCO_3 \text{---} > LiCO_3+CO_2+H_2O \quad \text{Reaction \#2}$$

(6) Lithium carbonate is separated from mother liquor and washed with 90° C. deionized water from (7) on filter (6).

(8) Lithium carbonate is packaged in maxi sacks and stored until processing in the direct lithium chloride plant at (C18) or dried to provide low sodium lithium carbonate.

(9) Mother liquor from the bicarbonate/carbonate crystallizer and wash water are recycled and a bleed (10) equal to the input wash is removed and used in the lithium carbonate plant product as wash water (A 16).

(11) Carbon dioxide gas used in the generation of lithium bicarbonate solution is recycled from the bicarbonate/carbonate crystallizer and a make up source (12) is used to compensate for system leaks and to keep a constant pressure to the lithium bicarbonate sparger reactor (3)

(13) A heat exchanger is used to preheat the bicarbonate solution prior to the precipitation tank and conserve system heat.

To increase the rate of conversion of lithium carbonate to lithium bicarbonate, it is preferred to employ baffles and dual pusher propellers to maximize the time that a bubble of carbon dioxide remains in solution. Increasing the height of the vessel also increases the residence time of the carbon dioxide. It was also discovered that using lithium carbonate with an average particle size of from about 75 to about 425 microns, and preferably less than 250 microns, most preferably about 425 microns, also increases conversion rates of lithium carbonate to lithium bicarbonate.

It was also discovered that technical grade lithium chloride can be directly precipitated from the same starting brine (about 6.0 wt % Li) used to prepare the low sodium lithium carbonate as described above. Thus, the process of the present invention produces a technical grade of lithium chloride product that is made directly from concentrated natural brine containing essentially 6 wt % lithium from which boron has been removed by the described extraction process of Brown and Boryta (U.S. Pat. No. 5,219,550). The lithium chloride produced by this process is essentially higher in purity with respect to sodium and calcium content. Using quick lime (CaO) instead of slaked lime ($Ca(OH)_2$) to precipitate magnesium as a double salt gives better filtration properties and improved lithium yield as concentrated brine than what can be achieved using the Chilean Patent application 550-95. Brine concentrated to lower lithium concentrations may also be treated by this method. However, the magnesium to lithium ratio is minimized when the concentration of lithium can be increased to approach the endpoint concentration of the system, i.e., 6 wt % Li, 1.7 wt % Mg, thereby minimizing the amount of magnesium that has to be removed.

The process involves removing the magnesium from the brine as a double salt using excess quick lime (CaO), separating the magnesium and calcium muds by filtration, cooling the filtered brine to reduce the sodium by precipitating sodium chloride, separating the sodium chloride solids by filtration, diluting the filtered brine slightly (to 29% LiCl) and treating the filtered brine with oxalate (oxalic acid) and barium (barium chloride) to remove precipitated calcium oxalate and barium sulfate, and subsequently crystallizing lithium chloride directly from the purified brine, e.g. in a vacuum crystallizer. The process may utilize the mother liquor produced in the process for preparing lithium carbonate as shown in FIG. 1 to recover the lithium lost to the magnesium removal step as described above. The use of lithium carbonate mother liquor improves the overall recovery of lithium as commercial products.

The process eliminates the need for using hydrochloric acid to produce lithium chloride from lithium carbonate and/or the $LiOH.H_2O$ as in the processes of the prior art. The resultant chemical grade lithium chloride process of the invention application has essentially 5 major steps described as follows:

1) Preparation of a low boron aqueous solution from natural brine and concentrating to a lithium content of about 6 wt %;

2) Removing magnesium and calcium by precipitation and filtration.

3) Cooling the brine to reduce the sodium content;

4) Adding oxalate and barium to remove calcium and sulfate; and

5) Direct crystallization of lithium chloride.

The 6 wt % lithium brine is prepared as described above, e.g. by solar evaporation. The purification of the boron free concentrated brine containing essentially 6 wt % lithium is described in more detail as follows:

Magnesium is removed from the brine by adding enough quick lime to form magnesium and a calcium insoluble double salts. The use of quick lime instead of slaked lime improves the filterability of the magnesium/calcium containing muds and improves the overall brine yield containing lithium. according to the follow reaction which occurs in lithium concentrated brine at Ca(OH)$_2$/Mg mole ratio from 2-3:

$$18Ca(OH)_{2\ solid} + 10MgCl_{2\ solid} + 0.5H_2O_{liquid} \rightarrow$$

$$Mg_{10}(OH)_{18}Cl_2.0.5H_2O_{solid} + 18CaClOH_{solid}$$

The filtration properties and lithium yield as brine improves substantially using quick lime (CaO) compared to slaked lime (Ca(OH)$_2$). In order to maintain the calcium insoluble, the Ca to Mg mole ratio for quick lime addition is preferably between 3 and 4 and the reaction is set forth below:

$$18CaO_{solid} + 10MgCl_{2\ solution} + 9.5H_2O_{liquid} \rightarrow$$

$$18CaClOH_{solid} + Mg_{10}(OH)_{18}Cl_2.0.5H_2O_{solid}$$

Regardless of whether quick lime or slaked lime is used, the process is typically conducted at temperatures ranging from about 25° C. to about 120° C. If filtration becomes a production rate controlling variable, then the temperature may be increased to precipitate both magnesium and calcium.

The final pH of the brine after completion of the reaction generally ranges from about 9.5 to about 12.0 measured at 1:10 dilution with water.

Excess slaked lime or additional reaction time may be used as a process control.

In a preferred embodiment, lithium lost to the lithium chloride magnesium purification solids may be recovered by re-slurrying these muds in the reactor for precipitating magnesium carbonate in the lithium carbonate process.

Compared to the magnesium removal steps described above for preparation of lithium carbonate (FIG. 1 (6)), an overall increase in lithium yield may be obtained for this purification step by adding magnesium and calcium double salt purification muds (FIG. 1 (4)) from the direct lithium chloride process.

Sodium may be removed to acceptable levels by either cooling before or after magnesium removal. However, cooling before magnesium removal also salts out LiCl.H$_2$O because the brine is saturated with respect to lithium chloride and magnesium chloride. To overcome the loss of lithium, an extra filtration step may be used to recover the lithium precipitated followed by recycling the LiCl.H$_2$O salt.

In a preferred embodiment, magnesium is removed first by addition of lime followed by cooling the brine containing 6% Li to from minus 30 to +10° C., preferably below 0° C., and more preferably −15° C. to −20° C., preferably from −30 to below −20° C., to reduce the sodium concentration to less than 0.05 wt % sodium in the brine. This level of sodium is low enough for producing a chemical grade of lithium chloride crystal that can be used as feed salt to produce lithium metal containing less than 1% Na. Removal of magnesium prior to cooling in essence produces a dilute brine with respect to lithium chloride, thereby substantially eliminating a lithium loss at this point in the process. A substantial portion of the calcium concentration in the brine when magnesium is removed is initially controlled by the quick lime addition in excess of a Ca/Mg mole ratio of 3, or by adjusting the pH above 11 by adding quick lime.

Removing the remaining calcium as insoluble calcium oxalate and sulfate as barium sulfate by the addition of oxalic acid and barium chloride, respectively, may be done in the same reactor with a single filtration step. Lithium oxalate and barium chloride are preferred salts for the precipitation step, although others may be used. Removal of calcium and sulfate may be done either before or after the sodium removal step.

The brine is preferably diluted to between 29 and 33 wt % lithium chloride for this step. Therefore, it is preferred to conduct this purification step after the sodium removal.

In preferred embodiments, the calcium/sulfate removal is conducted by first lowering pH to about 10.0 by addition of concentrated HCl, and then adjusting the calcium concentration to 500 ppm by the addition of calcium chloride. The pH of the brine is then adjusted to a pH of between 7.0 and 4.0.

In a particularly preferred embodiment, a solution of lithium oxalate is added to the brine at a ratio of 1.5 moles lithium oxalate to 1.0 mole calcium. Barium chloride is added at a 1:1 molar ratio to precipitate the sulfate. The brine is mixed and allowed to react for between 4 to 24 hours. Preferably, the lithium oxalate is added first, the reaction allowed to continue for about 4 hours. Then the pH is adjusted to about 7.0, and the barium chloride is then added to precipitate the sulfate as barium sulfate. The filtered lithium chloride solution will then be ready for the crystallizer.

The final brine is evaporated to dryness to recover the lithium chloride. Alternatively, the brine can be used as a crystallizer feed brine to precipitate anhydrous lithium chloride.

To produce anhydrous lithium chloride from solution, it is preferred to conduct the crystallization in an evaporation crystallizer operating at a temperature above 110° C. If impurities reach unacceptable concentrations, the crystallizer solution may be returned to the purification steps for adjustment.

An example of the lithium chloride purity produced by the above process is as follows:

| | |
|---|---|
| LiCl | 99.0 wt % |
| Na | 0.09-0.11 wt % |
| Ca | 0.0015-0.003 wt % |
| Mg | <0.0003 wt % |
| Ba | 0.007 wt % |
| SO$_4$ | 0.007 wt % |
| Si | 0.004 wt % |

Figure 3:
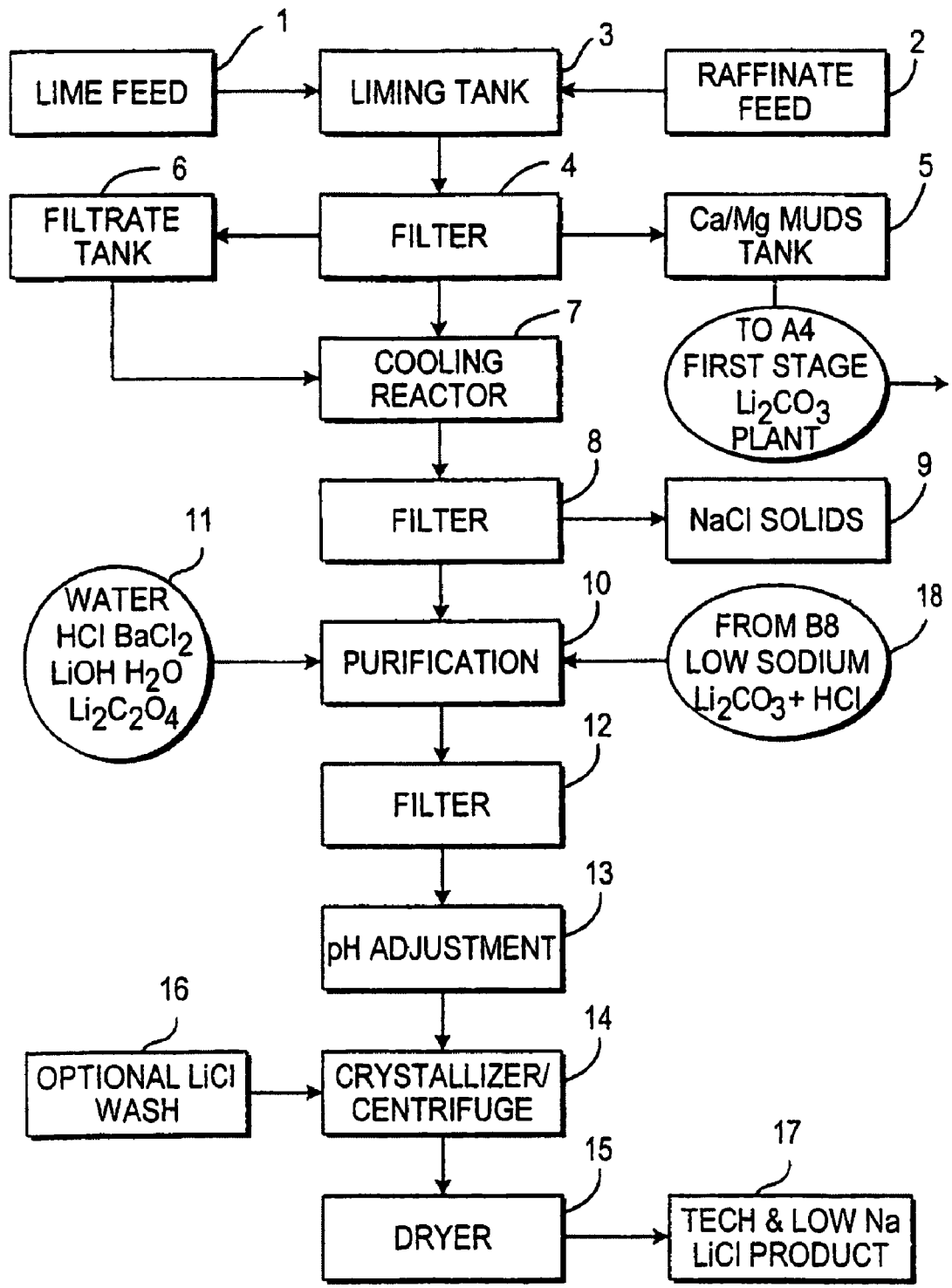
FIG. 3 is a flow diagram of the process of direct lithium chloride recovery from brine according to the present invention of a preferred embodiment of the invention.

The direct lithium chloride process is now described in more detail below with respect to FIG. 3. (1) CaO and low boron raffinate feed containing 6% lithium (2) are fed into the liming tank (3) where they are mixed at a weight ratio of 15% lime to brine, they are mixed until a pH greater than 11.0 as measured on a filtered sample diluted 1:10 with water.

(4) The slurry produced in the liming tank is filtered to separate the magnesium free brine from the Ca/Mg mud. The brine is sent to the filtrate tank (6) and the mud is sent to the muds tank (5) where it can be slurried and pumped to the lithium carbonate plant (A4 in FIG. 1) for recovering the entrained lithium in the first stage of the lithium carbonate plant (shown in FIG. 1 as 6).

(7) The magnesium free brine is fed into the cooling reactor to precipitate sodium chloride to acceptable levels and is filtered at temperature in (8). The solids (9) are sent to waste or for lithium recovery in the carbonate plant. The low sodium brine is sent to the purification tank (10).

(10) In the purification tank water is added to dilute the magnesium free low sodium brine to 33% lithium chloride, HCl is added to adjust the pH to 4.0 and barium chloride is added to precipitate barium sulfate from the brine. The pH is raised to 10.0 with lithium hydroxide monohydrate and lithium oxalate is added to precipitate calcium oxalate.

(12) The solution is filtered to remove the barium sulfate, calcium oxalate, and magnesium hydroxide solids and is sent to the adjustment tank (13) for a final pH adjustment to 7.0 for feed to the crystallizer (14) and dryer (15) to produce anhydrous technical lithium chloride (17)

(16) An optional pure lithium chloride wash solution can be employed to reduce potassium levels for technical lithium chloride

(18) Low sodium lithium carbonate from (FIG. 2 B8) is reacted with hydrochloric acid to produce a high purity lithium chloride solution, which is fed into the purification tank (10) and treated for sulfate and calcium as before to produce battery grade anhydrous lithium chloride.

The invention also relates to a method for purifying metal carbonates that are insoluble in water but have corresponding metal bicarbonate salts that are more 75% by wt. soluble in water by prepare an aqueous slurry of said metal carbonate; introducing carbon dioxide gas into said aqueous slurry to form a corresponding metal bicarbonate solution; and heating the metal bicarbonate solution to form a purified metal carbonate, wherein the heating is such that the temperature of the solution is raised to a temperature at which the metal carbonate is insoluble to precipitate the purified metal carbonate. Lithium is a preferred metal, but any metal having a carbonate that is insoluble in water, preferably at a temperature of 70 -95° C., but wherein the bicarbonate is at least 75% soluble (by weight), may be used in accordance with the present invention. Thus, a general method of providing purified metal carbonates is also a part of the invention.

EXAMPLE 1

Preparing Low Sodium Lithium Carbonate

To a concentrated brine containing 6.19% Li, 1.51% Mg, 0.179% Na, 0.026% K, 0.056% Ca, 0.002% $SO_4$, 0.0003% B, and 36% Cl, recycled mother liquor containing 0.14% Li, 8.26% Na, 0.18% $SO_4$, 12.37% Cl, and 0.58% $CO_3$ was added at a temperature of 70° C. Enough mother liquor was added to form a solution containing 1% Li. This also precipitated most of the magnesium as magnesium carbonate and basic magnesium carbonate. The solution was filtered to remove the precipitated magnesium. The magnesium remaining in solution was removed by adding a limed soda ash reagent which also reduced calcium as an insoluble calcium carbonate solid. The resultant purified brine was filtered and contained 1% Li, 0.0002% Mg, 0.0024% Ca, 6.9% Na, 15.5% Cl. A soda ash solution was prepared using lithium carbonate wash water filtrate and added to the purified brine. The lithium carbonate crystals were filtered and subsequently washed with hot de-ionized or distilled water and subsequently used as the feed to the bicarbonate reactor. The lithium carbonate filtrate, which is the mother liquor, was recycled to the process, and the wash filtrate was recycled to prepare the soda ash solution. A portion of the mother liquor was discharged from the process to remove the excess water and sodium chloride accumulated in the aqueous phase.

The filtered lithium carbonate crystals, a cooled mixture of recycled low sodium lithium carbonate mother liquor filtrate and wash water filtrate, and carbon dioxide gas from the low sodium lithium carbonate crystallizer were fed continuously to form a slurry in a baffled bicarbonate reactor. The carbon dioxide gas was dispersed using a high-speed mixer. The carbon dioxide gas and the mother liquor/wash filtrate solution were fed to the bottom of the reactor. This formed a bicarbonate solution that was filtered and sent to the lithium carbonate crystallizer. In this example the reactor temperature to form the bicarbonate solution was controlled between 0° C. and 35° C. The lithium carbonate feed rate was controlled to maintain as much suspended solids as possible. The liquid volume of the entire system was maintained constant and the excess liquid volume generated by the addition of the wash filtrate was used as the process bleed.

Prior to feeding the cool bicarbonate solution to the crystallizer, it was filtered to remove insoluble impurities and heated in a heat exchanger to recover the heat contained in the recycled mother liquor and wash filtrate. The preheated bicarbonate solution was then continuously added to the heated bicarbonate decomposer/lithium carbonate crystallizer maintained at 70° C. to 90° C. The lithium carbonate solids and the liquid were continuously removed and filtered hot. The filtered low sodium lithium carbonate crystals were continuously washed with hot distilled water then dried. The mother liquor and the wash filtrate were recycled to the bicarbonate reactor via a heat exchanger.

Table 4 gives an example of the production rate for the continuous purification apparatus described according to the conditions in Example 1. Table 5 gives the analysis of products produced.

TABLE 4

RELATION OF PRODUCTION RATE AND TEMPERATURE IN AN APPARATUS FOR CONTINUOUSLY PRODUCING LOW SODIUM LITHIUM CARBONATE

| REACTOR TEMPERATURE, ° C. | | Li2CO3 CRYSTALLIZATION |
|---|---|---|
| $LiHCO_3$ | $Li_2CO_3$ | RATE, grams/hour |
| 35 | 70 | 45.4 |
| 35 | 90 | 89.2 |
| 10 | 70 | 108.9 |
| 0 | 70 | 113.4 |
| 10 | 90 | 133.5 |
| 0 | 90 | 195.2 |

TABLE 5

CHEMICAL ANALYSIS (DRY BASIS)

| | Li2CO3 Feed, ppm | Low Sodium Li2CO3, ppm (average from Example 1) |
|---|---|---|
| Na | 800 | 4.0 ± 0.7 |
| Mg | 28 | 6.3 ± 1 |
| Ca | 81 | 34 ± 14 |
| S | 120 | 16 ± 16 |
| B | 1.2 | 0.5 ± 0.04 |
| Si | 82 | 4.5 ± 1.5 |
| Fe | 3.3 | 1.2 ± 0.3 |

EXAMPLE 2

Preparing Ultra High Purity Lithium Carbonate

Ultra high purity lithium carbonate was prepared as described above in the same equipment to which was added an ion exchanger between the filter and the heat exchanger. The ion exchange column contains Rohm and Haas, Amberlite IRC-718. The purity of this product is listed in Table 6.

TABLE 6

ULTRA HIGH PURITY LITHIUM CARBONATE (EXAMPLE 2)

| Wt % | |
|---|---|
| Li2CO3 | >99.995 |
| Mg | <0.00001 |

TABLE 6-continued

ULTRA HIGH PURITY LITHIUM CARBONATE (EXAMPLE 2)

| | Wt % |
|---|---|
| Na | <0.0004 |
| K | <0.00015 |
| Ca | <0.00007 |
| SO4 | <0.003 |
| B | <0.0001 |
| Cl | <0.005 |
| Si | <0.0001 |
| Zn | <0.00001 |
| Cr | <0.00001 |
| Cu | <0.0001 |
| Fe | <0.0001 |
| Ni | <0.0001 |
| P | <0.006 |

EXAMPLE 3

Preparing Low Sodium Lithium Chloride

Hydrochloric acid (35% conc.) containing less than 0.00015% sodium was reacted with lithium carbonate prepared in Example 1. The resulting solution was evaporated to crystallize lithium chloride. The lithium chloride was filtered from the evaporated solution and dried.

EXAMPLE 4

Preparing Ultra High Purity Lithium Chloride

As in Example 2, ultra-high purity lithium chloride was prepared by passing the lithium chloride solution described in Example 3 through an ion-exchange column to further reduce divalent and trivalent impurities. The solution was crystallized to make ultra-high purity lithium chloride.

EXAMPLE 5

Low Sodium Lithium Carbonate Using an Absorption Column

The diagram in FIG. 5 was the laboratory set-up used from which the larger scale tests were done using a sieve tray column (FIG. 6) and Scheibel column (FIG. 7).

The method followed that already described in Example 1. The purified product had the same composition as in Example 1. This demonstrated that absorption of carbon dioxide can be accomplished in a typical reactor with a bubbler or an absorption column.

Other facets of the invention will be clear to the skilled artisan, and need not be set out here. The terms and expression which have been employed are used as terms of description and not of limitation, and there is no intention in the use of such terms and expression of excluding any equivalents of the features shown and described or portions thereof, it being recognized that various modifications are possible within the scope of the invention.

It is claimed:

1. Solid lithium chloride containing less than 15 ppm sodium as an impurity.

2. Solid lithium chloride containing less than 4 ppm sodium as an impurity.

* * * * *